United States Patent

[11] 3,588,135

| | | |
|---|---|---|
| [72] | Inventor | Raymond J. Porter<br>Panania, Australia |
| [21] | Appl. No. | 790,061 |
| [22] | Filed | Jan. 9, 1969 |
| [45] | Patented | June 28, 1971 |
| [73] | Assignee | Gulf & Western Industrial Products Company<br>Grand Rapids, Mich. |

[54] QUICK-CHANGE TOOL ADAPTER
4 Claims, 3 Drawing Figs.

[52] U.S. Cl. .................................................. 279/83
[51] Int. Cl. .................................................. B23b 31/04
[50] Field of Search .......................................... 279/1 (A),
83, 76, 77, 78, 93

[56] References Cited
UNITED STATES PATENTS

| 366,826 | 7/1887 | Gavin et al. | 279/93 |
| 1,744,521 | 1/1930 | Briese et al. | 279/83 |
| 2,362,053 | 11/1944 | Danielson | 279/83 |

FOREIGN PATENTS

| 143,122 | 1920 | Great Britain | 279/83 |

Primary Examiner—Andrew R. Juhasz
Assistant Examiner—Donald D. Evenson
Attorney—Meyer, Tilberry and Body ABSTRACT: A tool holder to engage a tool element shank comprising a body portion including a socket formed therein, and a cylindrical bushing seated within said socket including generally coaxial cylindrical inner and outer surfaces, said inner surface being longitudinally slotted or relieved to define at least two longitudinally extending spaced lands which accurately register the tool element shank radially within the tool holder. Means are provided to press the tool element shank against the bushing lands, and cooperating pin and slot means accurately register the tool element shank longitudinally or axially within the tool holder socket.

PATENTED JUN 28 1971

3,588,135

INVENTOR.
RAYMOND J. PORTER
BY
Meyer, Tilberry & Body
ATTORNEYS.

QUICK-CHANGE TOOL ADAPTER

DESCRIPTION

The present invention relates to a tool element holder, and more particularly, to an improved construction of a tool element holder for high-precision machining of a workpiece.

The invention is particularly applicable to single-shank tool elements or toolbars, and to an improved tool holder which permits rapid changing of tool elements and precise location or relocation of the tool element in the tool holder.

Tool holders of the type to which the present invention is directed are known provided with a socket adapted to receive a tool element shank, the term being used herein to designate either the shank of the tool itself, or the shank of an adapter for mounting the tool, to quickly position the tool element in a defined relationship, both radially and longitudinally, with respect to the holder and the workpiece. As a general rule, the tool holder sockets are accurately machined so that the inside socket surface is in close-fitting engagement with the tool element shank, to position the element shank radially within the tool holder. Usually the element and holder are also provided with cooperating abutting surfaces which locate the tool element shank axially or longitudinally within the holder.

One problem experienced with conventional tool holders is that very close-tolerance machining is required, of both the tool holder socket and tool element shank to obtain accurate radial positioning of the shank. The accuracy with which the tool element and tool holder can be aligned, or closeness of tolerance, is limited by the need to be able to insert a tool element quickly within its holder, requiring more than a sliding fit tolerance. This means that, of necessity, the radial alignment at least will be less than perfect.

The above problem is particularly acute in production work, when a tool may requires frequent removal from the machine for sharpening. Following sharpening when the tool element is reinserted in the tool holder, it is necessary that it be accurately positioned relative to the work to continue the machining operation, and that the tool change be effected as quickly as possible. With the conventional close-fit tool holder there must be a sacrifice in either the speed by which the change can be effected, or in the accuracy of realignment of the tool element in the holder.

In multiple-operation machining of a workpiece, it frequently is necessary to use different tool elements requiring during the machining process replacement of one type of tool element with another, and accurate and rapid realignment and positioning of the new tool element with respect to the work. Difficulty in positioning a new tool element also can unduly increase machining time, or alternatively result in a sacrifice in accuracy in of realignment.

Where efforts have been made to overcome the above problems, the tool holders developed have conventionally been of complicated and costly design and construction.

It is an object of the present invention to overcome the above problems, and in particular to provide a simplified and more economical tool holder which achieves a rapid and precise repeat-location of tool elements.

It is a further object of the present invention to provide a tool holder which is useful with all types of tool elements including boring bars, cutter arbors, and drill sleeves.

In accordance with the invention, there is provided a tool holder comprising a body portion including a socket formed therein. A cylindrical hollow bushing is seated within a socket including generally coaxial cylindrical inner and outer surfaces, the inner surface being longitudinally slotted or relieved to define at least two longitudinally extending spaced-apart lands which accurately register the tool element shank radially within the tool holder. Means are provided to press the tool element shank against the bushing lands, and cooperating pin and slot means accurately register the tool element shank longitudinally or axially within the tool holder socket.

Preferably, the pin and slot means is in the form of a radially extending pin on the tool element shank and a bayonet type of recess in the bushing.

It is also preferred that the recess in the bushing comprise an axially extending slot which bisects a circumferential slot defining an arc in the bushing side, the tool element shank pin seating at one or the other ends of the circumferential slot to prevent rotation of the shank when the latter is subjected to torque.

It will be apparent that the combination in accordance with the present invention insures that a tool element or bar may be removed and replaced a great number of times, each new tool element or bar returning to the same radial and axial position in the tool holder. In addition, successive different operations may be performed by the use of appropriate tool elements or bars, all tool elements or bars cutting to consistent sizes with a high degree of accuracy.

The invention and advantages thereof will become apparent upon further consideration of the specification, with reference to the accompanying drawings, in which.

Figure 1:
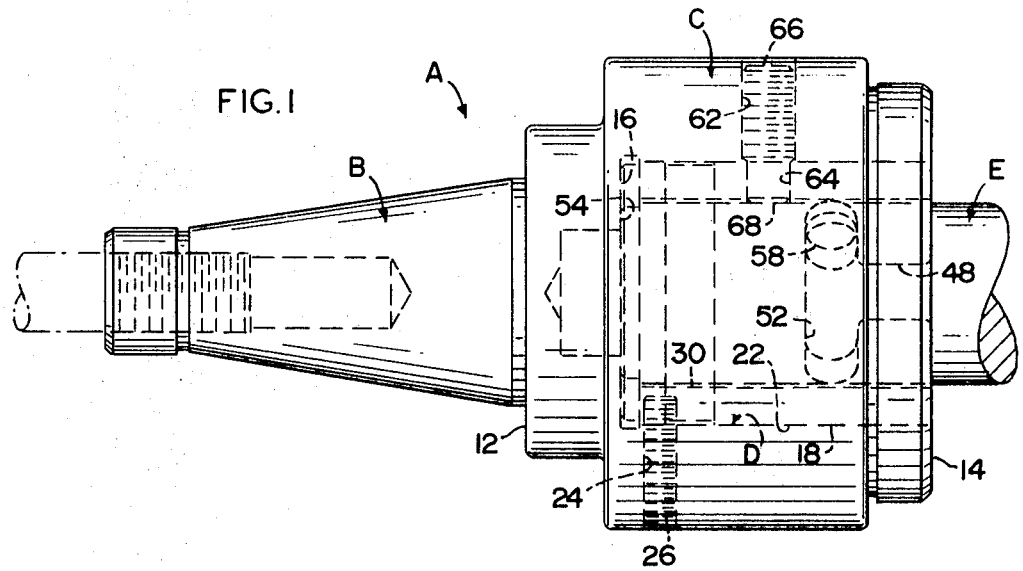
FIG. 1 is an elevation view of a tool holder in accordance with the invention.

Referring now to the drawing, wherein the showings are for the purposes of illustrating the preferred embodiment of the invention only and not for the purpose of limiting the same, the FIGS. show a tool holder A provided with a shank portion B for mounting on the spindle or arbor of a machine, not shown, such as a turret lathe, or boring machine, and a body portion C which defines an axial longitudinally extending socket D arranged to accommodate the shank E of a tool element.

Referring to the drawings in detail, the tool holder body portion C is generally cylindrical in shape, including a longitudinally extending axis between a shank end face 12 and an exposed end face 14, the shank portion B of the holder extending from the body portion end face 12 axially aligned with the axis of the body portion. The shank is tapered inwardly in a conventional manner in a direction away from the body portion for suitable engagement with the spindle of a machine. Between the opposite shank end face 12 and exposed end face 14, the body portion is of enlarged diameter for reasons which will become apparent.

In accordance with the invention, the shank E of the tool element can be either the shank of a tool itself or of an adapter for mounting the tool, and the tool can be for boring, cutting, drilling or a number of other machining operations.

The socket D which is located within the body portion of the tool holder is cylindrical and generally coaxial with outer surface of the body portion, extending axially from the exposed end face 14 to an inner bottom surface 16, the depth of the socket depending upon a number of design factors. Within the socket, and in accordance with the invention, there is a generally cylindrical bearing sleeve or bushing 18 which extends the full depth of the socket from the end face 14 to the bottom surface 16.

Preferably, the inside surface 10 of the tool holder socket D, and the outside surface 22 of the bushing 18 will be accurately machined so that there is an interference fit between the bushing and the socket, securely holding the bushing in exact alignment and location within the socket. Prior to machining the bushing is hardened and tempered.

In addition to the interference fit which holds the bushing in exact location within the socket of the tool holder, the tool holder body portion is drilled radially at least at one point, and threaded to provide a radially extending hole 24 into which is threaded a dowel 26. The bushing also is bored with a radially extending opening 28 aligned with the hole 24 in the tool holder body portion, so that when the dowel is threaded into the tool holder body, it engages the opening 28 of the bushing to secure the latter against rotation when subjected to torque.

By screwing the dowel in the tool holder body, the dowel can be removed easily if maintenance is required.

Figure 2:
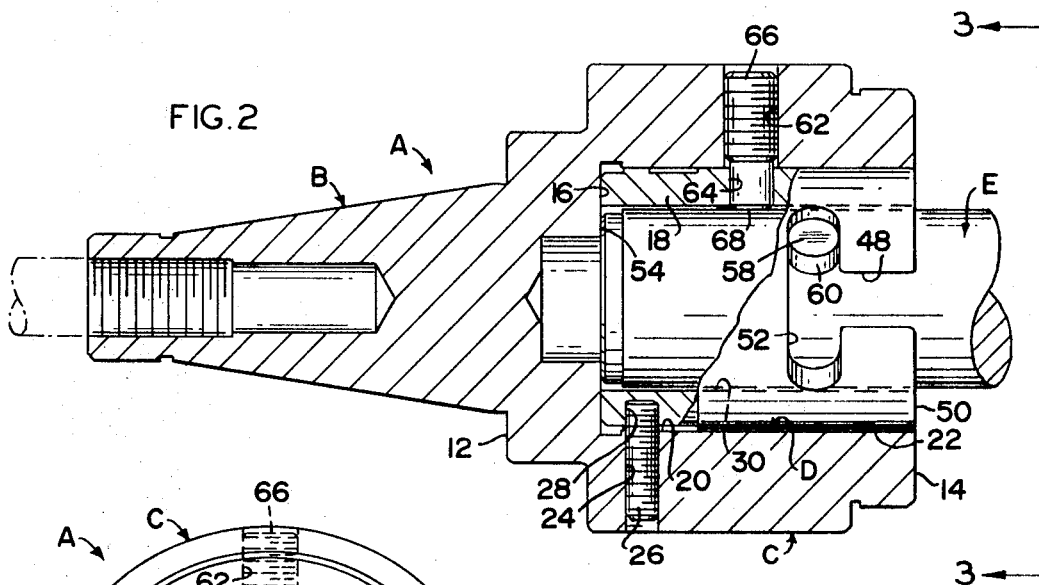
FIG. 2 is a partial section elevation view of the tool holder of FIG. 1.
Figure 3:
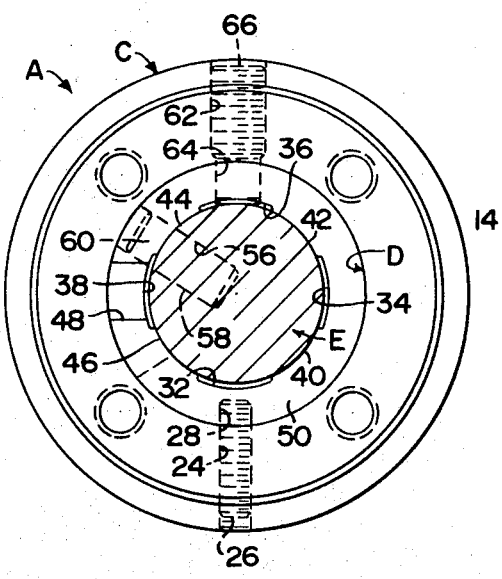
FIG. 3 is an end view taken along line 3—3 of FIG. 2.

As shown in FIGS. 2 and 3, the bushing inner surface 30 is generally cylindrical, being relieved or slotted at four circumferentially disposed equally spaced-apart areas 32, 34, 36 and 38 forming longitudinally extending recesses, and defining four diagonally spaced lands 40, 42, 44 and 46, which also extend longitudinally along the inner surface of the bushing, the full length thereof. The diameter or circumference defined by the recesses need not be accurate, but it is necessary that the lands be accurately finished (hardened and machined) to lie in a circumference which is less than the circumference in which the recesses lie. As shown, the inner periphery of the bushing is approximately equally divided into the lands and recessed portions, the center to center distance between adjacent lands being about 90°.

It is a feature of the invention that the diameter of the circumference in which the land bearing or inner surfaces lie is only slightly greater than the shank diameter of the tool element to be used therewith; and that the small surface area presented by the four land bearing or inner surfaces along which the tool element shank rides offers little resistance to insertion and removal of the shank.

Referring to FIG. 3, along the left-hand side of the bushing, a slot portion 48 is provided which extends axially from the exposed end 50 (FIG. 2) of the sleeve or bushing inwardly a set distance communicating with and bisecting a circumferentially extending slot portion 52 defining an arc in the bushing side, the two slot portions together having a T or bayonet configuration as shown in FIG. 2. The slot portion 52, in particular, is accurately formed with precise dimensions.

A tool or tool element which is to be used with the tool holder is provided with a shank portion E, (FIG. 1), extending from a main part which would include the tool as an integral part thereof, or some means for mounting a tool thereon. In either case, the tool element shank E is provided with an accurately machined diameter, and spaced from the leading end 54 which is to be first inserted within the bushing, the tool element shank is provided with a hole 56 into which a hardened and ground dowel 58 is seated. The dowel has an exposed portion 60, but it is sufficiently short in length so that the height of the dowel which is exposed is less than the slot depth in the bushing. In this way, there is adequate clearance between the dowel and the inside surface of the tool holder socket.

Also provided, in accordance with the invention, is a threaded radially extending opening 62 in the top of the body portion of the tool holder, aligned with a hole 64 in the bushing, at the same peripheral location. A setscrew 66 is threaded into the opening 62 having an inner bearing surface 68 which seats or bears against the tool element shank E at a point generally opposite to the lands 40 and 46 (FIG. 3).

In operation, the cutting tool element shank E is inserted within the bushing 18, the exposed portion 60 of the dowel on the shank riding along the slot portions 48 and 52 formed in the bushing. The cutting tool element is turned so that the dowel rides either upwardly or downwardly in the circumferentially extending slot portion 52, thereby accurately positioning the tool element shank axially, and also circumferentially within the holder bushing. Following this, the setscrew 66 is turned to press the tool element shank against the lands 40 and 46 of the bushing, thereby accurately positioning the tool element radially within the tool holder.

In certain tool applications, the tool holder may be subjected to torque or rotational forces tending to rotate the tool element in the holder. To prevent this, the tool element s is either rotated clockwise or counterclockwise until the dowel exposed portion 60 seats in the base of one of the slots 52, after which the screw 66 is tightened.

It may be desired to remove a cutting tool, for sharpening, and to reinsert it after sharpening, or another, in the tool holder for completing a finishing cut.

In that the diameter of the circumference in which the lands of the bushing lie slightly greater than the diameter of the tool element shank, it is apparent that the tool element can very easily be removed and reinserted within the bushing or tool holder; or replaced with successive tool elements; as compared to the difficulty of insertion and removal experienced in tool holders wherein radial location is taken care of by close circumferential fitting engagement between the tool shank and the holder socket.

By the same taken, since no clearance in the locating surface (for radial location) need by provided (for removal and insertion purposes), the inner bearing surfaces of the lands can very accurately be machined, to any degree possible, with the result that there is virtually no limit to the accuracy with which the tool element shank can be axially located; or to the accuracy with which the finishing cut can be completed. In the prior art, even with close-fitting engagement between the holder and tool element shank, the clearance required for removal and insertion of the tool element permitted enough shank movement radially to prevent accurate work.

In addition, by means of the bayonet-type slot in the bushing, and cooperating pin on on the tool element shank, accurate axial location of the tool element within the tool holder is obtained.

Further, it may be desired to perform a different operation on a workpiece. The present invention permits a rapid change of tool elements and precise location for each successive operation.

As a further advantage, it is apparent that the present invention offers a simplified and less expensive means for obtaining rapid precise repeat location of tool elements, as compared to the more complex holders heretofore available.

Although the invention has been described with reference to specific embodiments, variations within the scope of the following claims will be apparent to those skilled in the art.

I claim:

1. A tool element holder for receiving and accurately maintaining a tool element having a predetermined shank diameter in a desired position relative to said holder, said holder comprising:
    an elongated holder body including opposed end portions and a longitudinal axis, one of said end portions including means for affixing said body to a machine tool and the other of said end portions including an elongated chamber area generally coaxial with said axis and extending inwardly into said body from said other of said end portions;
    an elongated tool-receiving sleeve adapted to be closely fitted into said chamber coaxial with said body, said sleeve including inner and outer peripheral surfaces, a plurality of spaced-apart longitudinally extending tool-locating areas on said inner periphery defining a tool-seating chamber coaxial with said body, said chamber being of a nominally larger diameter than said shank diameter, and means for receiving a positioning protrusion on said tool shank for longitudinal and first radial positioning of said tool element;
    means associated with said body and said sleeve for forcing said tool element into seating engagement with at least two of said locating areas for second radial positioning of said tool element; and,
    means associated with said body and said sleeve for preventing rotation of said sleeve relative to said body.

2. The tool holder a defined in claim 1 wherein said forcing means comprises a radially extending screw threadably engaging said body and extending through said sleeve into said seating chamber whereby said tool element may be forced into said seating engagement with said at least two tool-locating areas and said receiving means comprises a bayonet slot.

3. The tool holder as defined in claim 1 wherein said rotation-preventing means comprises a radially extending threaded dowel engaging each of said body and said sleeve.

4. The tool holder of claim 1 wherein said locating areas comprise four longitudinally extending equal radiused lands, said radii being nominally larger than said shank radius, said lands being spaced peripherally equidistant around said inner peripheral surface with said forcing means positioned to extend inwardly into said seating chamber between the longitudinal centers of two of said lands.